July 15, 1952 G. W. SCHATZMAN 2,603,510
FENDER SHIELD CONSTRUCTION
Filed Oct. 1, 1949
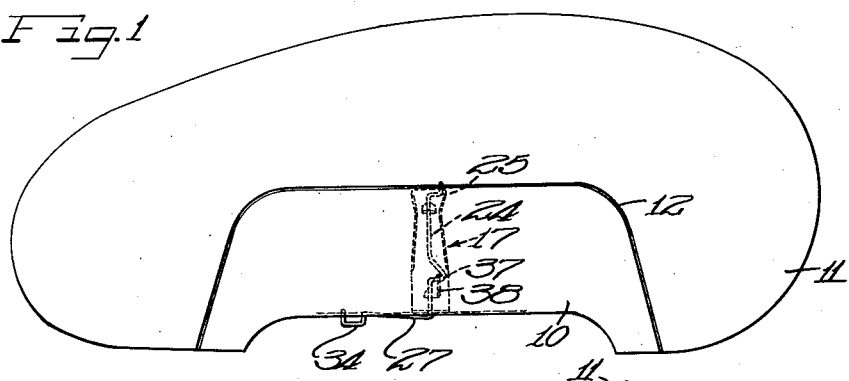
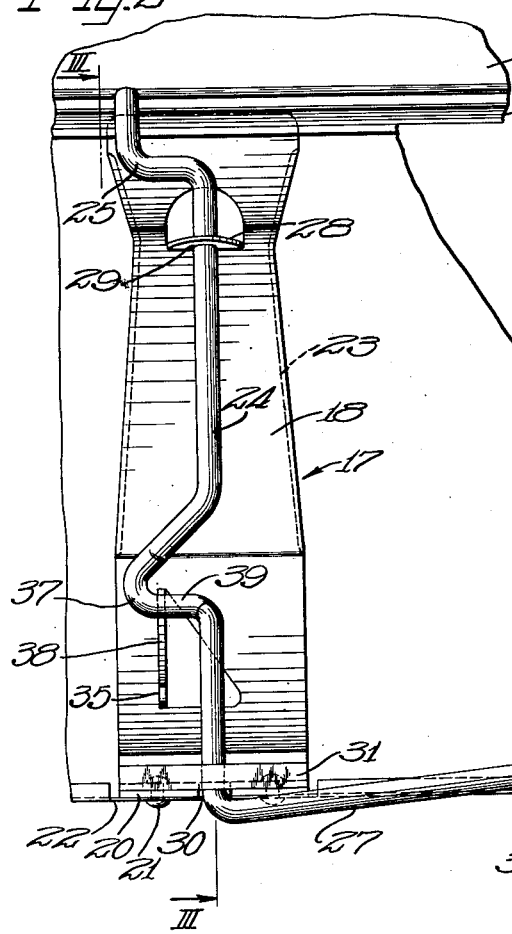
Inventor
George W. Schatzman
By The Firm of Charles W. Hill Attys Patented July 15, 1952

2,603,510

UNITED STATES PATENT OFFICE 2,603,510

FENDER SHIELD CONSTRUCTION

George W. Schatzman, Detroit, Mich., assignor to Houdaille-Hershey Corporation, Detroit, Mich., a corporation of Michigan Application October 1, 1949, Serial No. 119,145

5 Claims. (Cl. 292—58)

The broad concept of the present disclosure is broadly covered in my copending application Serial No. 708,513, filed November 8, 1946.

The present invention relates to improvements in fender skirt or shield constructions and more particularly concerns a fender shield having novel means for latching the same in place on a fender.

In the vehicle industry, and particularly in the automobile branch thereof, various means have been utilized to improve the appearance of vehicle fenders. The usual vehicle fender is provided with an opening affording access to the vehicle wheel, and permitting ready removal or replacemnt of the wheel in an axial direction. Since this opening inherently presents an unattractive outward appearance, and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body and which opening is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide an improved fender shield having novel latching mechanism by which the fender shield is attached to a fender.

Another object of the invention is to provide an improved latching mechanism for fender shields.

A further object of the invention is to provide a novel fender shield latching mechanism of the torsion rod type having novel means for automatically controlling the operative position of the torsion rod latch member.

Other objects, features and advantages of the present invention will be readily apparent from the following detailed description of a preferred embodiment thereof taken in conjunction with the accompanying drawing in which:

Figure 1 is a side elevational view of a vehicle fender and fender shield assembly embodying a latching mechanism according to the present invention;

Figure 2 is an enlarged inside fragmentary elevational view of the fender and fender shield assembly showing the improved latching mechanism; and Figure 3 is a vertical sectional detail view taken substantially on the line III—III of Figure 2.

A representative embodiment of the present invention is adapted to be incorporated in a fender shield 10 which is designed to cooperate with a fender 11 to close a wheel access opening 12 in the outer side of the fender. For supporting the fender shield 10 in assembly on the fender, suitable attachment structure is provided at the opposite lower ends of the fender shield and cooperative with means on the fender at the respective opposite lower ends of the wheel access opening. In order to have the outer surface of the fender shield lie flush with the outer surface of the fender, a marginal recess is provided by an angular marginal flange 13 on the fender defining the wheel access opening 12. Within the marginal recess or groove defined by the flange 13 the margin of the fender shield 10 is received and maintained in substantially snug, rattle-free relation, a resilient sealing strip or gasket 14 being carried for this purpose by an inturned angular marginal reinforcing flange 15 on the fender shield.

For maintaining the upper portion of the fender shield 10 in assembled relation with the fender 11, latching mechanism 17 is provided on the fender shield. This mechanism comprises a vertical strut 18 preferably formed from appropriate gauge sheet metal mounted vertically at approximately the center of the fender shield panel relatively closely to the inner face thereof and having an upper terminal flange portion 19 engaging behind a downturned portion of the fender shield marginal reinforcing flange 15. At its lower end the strut 18 is preferably secured to the lower marginal portion of the fender shield 10 and for this purpose has an angular inwardly extending foot flange 20 which is secured as by means of rivets 21 to an inwardly extending lower marginal reinforcing and supporting flange 22 on the fender shield. Throughout a substantial portion of its length, the strut 18 is preferably reinforced by means of angular side flanges 23.

Supported by the strut 18 for rotary and reciprocal movement is a torsion latch rod 24. This latch rod is preferably formed from a single piece of suitable gauge wire or rod stock of a material having adequate resilience for the present purpose. Approximately quarter inch steel stock of suitable grade has been found satisfactory. At its upper end the torsion latch rod 24 is formed with an angular latching head 25, while at its lower end portion the torsion rod is formed to provide an angular handle 27 preferably extending to the opposite side of the body of the latch rod from the latching head 25.

Rotary and reciprocal guiding of the latch rod 24 is accomplished through the medium of a guide and journal ear 28 struck integrally from the body of the strut 18 adjacent to the top thereof and providing a journal or bearing aperture 29 through which the body of the latch rod extends below the latching head 25. Adjacent to the lower end of the latch rod 24 a bearing is provided by the foot flange 20 and the lower fender shield reinforcing flange 22, the superimposed flanges being formed with an inwardly opening bearing slot 30, a retaining plate 31 being superimposed upon the foot flange 20, secured thereto by the rivets 21 and having a rod clearance slot 31a opening outwardly and retaining the lower portion of the latch rod body within the lower guide bearing. The spacing between the upper bearing ear and the lower flange bearing for the latch rod is less than the spacing between the latching head 25 and the handle 27 so that the latch rod is afforded a sufficient range of vertical or reciprocal movement to permit the same to move from an upper latching position as shown in Figure 2 and in full outline in Figure 3 and a released position as shown in dash outline in Figure 3 wherein the latching head 25 will clear the fender flange 13 to permit mounting and demounting of the fender shield.

In mounting the fender shield 10 the latch rod 24 is moved to the released position shown in dash outline in Figure 3, the lower ends of the fender shield are attached to the fender and the fender shield is then rocked into the closing position to the wheel access opening 12, whereafter the handle 27 is manipulated to rotate the latch rod 24 about its vertical axis and move the latch rod upwardly to effect latching engagement of the latch head 25 with the inner side of the fender flange 13, the relationship of the latch head 25 and the handle 27 being such that in the final phase of the turning movement of the latch rod the latch rod is placed under torsional stress wherein the latching head 25 and the body of the latch rod cooperating with the strut 23 securely clamps the upper margin and more particularly the marginal flange 15 of the fender shield against the margin of the fender and more particularly within the flange 13. The torsional clamping function of the latch rod 24 is caused to persist by springing the handle 27 rearwardly and upwardly relative to the lower fender shield reinforcing flange 22 to engage an outwardly turned locking terminal 32 thereon retainingly over the lower fender shield flange 22 and into interlocking relation to an upstanding inner terminal portion 33 on the fender shield flange. For convenience in manipulating the handle 27 a generally downwardly projecting finger engageable loop 34 is provided therein adjacent to the interlock terminal 32.

Inasmuch as for one reason or another resistance is often encountered to upward movement of the torsion latch rod 24 into the latching position, novel means are provided by the present invention to assure automatic upward movement of the rod as an incident to turning the rod into latching position. For this purpose a cam element 35 is carried by the strut 18 to project inwardly therefrom into the path of a follower knee bend 37 in the body of the latch rod 24. By preference the cam element 35 comprises an integrally struck out ear derived from the lower portion of the strut body and bent to extend inwardly in a generally vertical plane in spaced relation at the side of the latch rod toward which the latching head 25 projects when in latching position. The cam ear 35 is provided with a diagonal upper cam surface 38 sloping from front to rear disposed to be automatically engaged by a lateral follower section or shoulder 39 at the lower portion of the bend 37. The location and relationship of the cam ear 35 and the follower bend 37 and more particularly the cam edge 38 and the follower shoulder 39 is such that when the latch rod 24 is turned toward latching position the follower shoulder 39 automatically engages the cam surface 38 and is cammed upwardly, thus positively driving the torsion rod 24 upwardly into proper latching relation of the cam head 25 opposite the fender shield flange 15 and behind the fender flange 13.

In order to have the upward movement of the latch rod 24 accomplished rapidly and to proper latching elevation co-ordinately with attainment of latching cooperation of the latching head 25 with the fender flange 13, the follower bend 37, and more particularly the follower shoulder 39 is preferably angled in advance of the latch head 25, as best seen in Fig. 3. That is, when viewed in side elevation, the follower shoulder 39 extends angularly outwardly or toward the latching face of the latching head 25. Furthermore, the cam edge 38 is formed on an appropriate fairly steep incline so that there is a rapid ascent of the shoulder 39 as the latch rod is turned toward operative latching position. By the same token, when the latch rod is turned toward released position there is a rapid drop toward the non-latching position.

It may also be observed that by having the cam ear 35 located fairly closely to the body of the latch rod 24 efficient upward thrust fairly close to the axis of the rod is effected during the camming action whereby to avoid distorsional stresses and minimize side thrust on the rod during operation.

It will be understood that modifications and variations may be effected without departing from the scope of the novel concepts of the present invention.

I claim as my invention:

1. In combination in a fender shield latching mechanism, a strut adapted to be secured to the inner side between the upper and lower margins of a fender shield panel, a rotary and reciprocable torsion latch rod, means on said strut providing a bearing for said latch rod, a cam element carried by said strut, and a follower extending laterally from the generally vertical axis of the body of the latch rod and cooperable to follow said cam element, said cam element and said follower being disposed to effect upward movement of the latch rod as an incident to turning of the latch rod into latching position to carry the upper end portion of the latch rod from a depressed position below the upper margin of the panel to an elevated position opposite said upper margin, said cam element comprising an ear integrally struck out and bent to extend inwardly from the body of the strut.

2. In combination in a fender shield latching mechanism, a strut adapted to be secured to the inner side between the upper and lower margins of a fender shield panel, a rotary and reciprocable torsion latch rod, means on said strut providing a bearing for said latch rod, a cam element carried by said strut, and a follower extending laterally from the generally vertical axis of the body of the latch rod and cooperable to follow said cam element, said cam element and said follower being disposed to effect upward movement of the latch rod as an incident to turning of the latch rod into latching position to carry the upper end portion of the latch rod from a depressed position below the upper margin of the panel to an elevated position opposite said upper margin, said bearing means comprising an ear struck out integrally from the body of the strut and lying in a generally horizontal plane and said cam element comprising an ear integral with and extending in a generally vertical plane from the strut adjacent to the body of the torsion rod.

3. In combination in a fender shield latching mechanism, a sheet metal strut adapted to be mounted at the inner side of a fender shield, a torsion rod latch member, said latch member having a latching head on the upper portion thereof extending toward one side, means on the strut below said latching head and providing a reciprocal and rotary bearing for the torsion rod affording clearance below said latching head to permit substantial vertical movement of the rod for movement of the latching head into and out of latching position by rotation and vertical movement of the rod, the rod having a lateral bend in the body thereof below the bearing means, and a cam ear extending inwardly from the strut and having an upwardly facing and downwardly inwardly sloping cam edge engageable by said bend whereby the bend will follow the cam edge and effect upward movement of the latch rod as an incident to turning the latch rod to swing the latching head into latching position.

4. In combination in a fender shield latching mechanism, a sheet metal strut adapted to be mounted at the inner side of a fender shield, a torsion rod latch member, said latch member having a latching head on the upper portion thereof extending toward one side, means on the strut below said latching head and providing a reciprocal and rotary bearing for the torsion rod affording clearance below said latching head to permit substantial vertical movement of the rod for movement of the latching head into and out of latching position by rotation and vertical movement of the rod, the rod having a lateral bend in the body thereof below the bearing means, and a cam ear extending inwardly from the strut and having an upwardly facing and downwardly inwardly sloping cam edge engageable by said bend whereby the bend will follow the cam edge and effect upward movement of the latch rod as an incident to turning the latch rod to swing the latching head into latching position, said follower bend being angled outwardly relative to the latching head to elevate the latch rod and the head in advance of the latching head reaching latching position.

5. In combination in a latching mechanism for fender shields, a sheet metal vertical strut, an inwardly struck out bearing ear adjacent the upper end of the strut, an inturned foot flange at the lower end of the strut having a bearing slot therein aligned with the bearing ear, a cam ear struck out integrally from the body of the strut above the foot flange and lying in a vertical plane at one side of the axis between the bearing ear and said bearing slot, said cam ear having an upper cam surface sloping downwardly inwardly at a relatively steep pitch, and a torsion latch rod reciprocable and rotatably supported in said bearing ear and said bearing slot and having a latching head at its upper end and a follower bend in an intermediate portion thereof cooperative with said cam ear, said latching head and follower bend extending toward generally the same side of the latch rod, whereby in turning the latch rod to carry the latching head into latching position the follower bend rides up the cam surface of said cam ear to raise the latch rod.

GEORGE W. SCHATZMAN.

REFERENCES CITED

The following references are of record in the file of this patent:

UNITED STATES PATENTS

| Number | Name | Date |
|---|---|---|
| 2,334,867 | Fergueson | Nov. 23, 1943 |
| 2,353,553 | Fergueson | July 11, 1944 |